United States Patent
Ekman et al.

(10) Patent No.: US 12,553,567 B2
(45) Date of Patent: Feb. 17, 2026

(54) ADJUSTABLE ROTOR SUPPORT AND ROTARY HEAT EXCHANGER WITH SUCH SUPPORT

(71) Applicant: Heatex AB, Malmö (SE)

(72) Inventors: Fredrik Ekman, Lund (SE); Johan Gidner, Lund (SE)

(73) Assignee: Heatex AB, Malmö (SE)

(*) Notice: Subject to any disclaimer, the term of this patent is extended or adjusted under 35 U.S.C. 154(b) by 135 days.

(21) Appl. No.: 18/521,041

(22) Filed: Nov. 28, 2023

(65) Prior Publication Data

US 2024/0175543 A1 May 30, 2024

(30) Foreign Application Priority Data

Nov. 29, 2022 (SE) .................... 2251385-7

(51) Int. Cl.
*F16M 13/02* (2006.01)
*F28D 11/02* (2006.01)

(52) U.S. Cl.
CPC ........... *F16M 13/022* (2013.01); *F28D 11/02* (2013.01)

(58) Field of Classification Search
CPC .................................................. H02K 15/144
USPC ......................................................... 165/67
See application file for complete search history.

(56) References Cited

U.S. PATENT DOCUMENTS

| | | | | |
|---|---|---|---|---|
| 3,193,916 A | * | 7/1965 | Brunell | F28D 19/04 165/8 |
| 3,724,007 A | * | 4/1973 | Kuss | A47C 27/085 5/915 |
| 3,724,844 A | * | 4/1973 | Olmstead | A63B 69/16 482/61 |
| 3,772,865 A | * | 11/1973 | Ruprecht | A01D 57/30 56/192 |
| 3,871,442 A | * | 3/1975 | Finnemore | B66F 3/24 165/8 |
| 4,669,531 A | * | 6/1987 | Conde | F28D 17/023 165/DIG. 41 |

(Continued)

FOREIGN PATENT DOCUMENTS

CN 217769655 U 11/2022
JP 2011021541 A 2/2011

(Continued)

OTHER PUBLICATIONS

European Patent Office, Office Action, Application No. 23212279.6, mailed Jul. 17, 2025, 5 pages.

*Primary Examiner* — Devon Lane
(74) *Attorney, Agent, or Firm* — Ziegler IP Law Group, LLC.

(57) ABSTRACT

An adjustable rotor support with a carrier beam configured to receive a center shaft of a rotor, at least one support brace connected to the carrier beam, and an adjustment arrangement operably connected to the support brace(s). The adjustment arrangement is configured to generate movement of at least one of the support brace(s), movement of the support brace(s) generating movement of the carrier beam along an adjustment axis (A1) perpendicular to a center axis (A2) of the center shaft. The adjustment arrangement is configured to lock the support brace(s) in a position reached through the movement such that the position is maintained by the adjustment arrangement during operation of the rotor.

15 Claims, 4 Drawing Sheets

(56) References Cited

U.S. PATENT DOCUMENTS

| | | | | |
|---|---|---|---|---|
| 5,267,712 A | * | 12/1993 | Shen | F16M 11/2064 396/428 |
| 2004/0101221 A1 | * | 5/2004 | Fuerst | H02K 5/161 384/535 |
| 2010/0224343 A1 | * | 9/2010 | Fukuma | B65G 49/061 165/67 |

FOREIGN PATENT DOCUMENTS

| | | | |
|---|---|---|---|
| WO | 2020112137 | A1 | 6/2020 |
| WO | 2022199900 | A1 | 9/2022 |

\* cited by examiner

ADJUSTABLE ROTOR SUPPORT AND ROTARY HEAT EXCHANGER WITH SUCH SUPPORT

TECHNICAL FIELD

The disclosure relates to an adjustable rotor support for rotary heat exchangers, as well as rotary heat exchangers comprising such adjustable rotor support.

BACKGROUND

A rotary heat exchanger comprises a rotor arranged in a casing of some kind. The rotary heat exchanger may be arranged in connection with, or within, a ventilation system, or any other suitable fluid system requiring heat transfer between two fluid streams such as, e.g., incoming and outgoing air or warm and cold water. The rotary heat exchanger may be arranged at any suitable angle such that the rotor extends in a vertical plane, a horizontal plane, or at any angle therebetween. Nevertheless, the rotor is preferably arranged such that it is aligned with the casing, i.e., such that there is no discrepancy or offset between the rotor and inner surfaces of the casing accommodating and surrounding the rotor.

During manufacture, the rotor is usually perfectly aligned within its housing, e.g., in a vertical position such that the center axis of the rotor center shaft extends in a vertical plane. However, rotary heat exchangers are often arranged in locations that are hard to reach, making the initial mounting as well as subsequent adjustment of the rotor very difficult.

Furthermore, during operation, the oppositely directed fluid streams apply force onto the rotor forcing the rotor to tilt out of its original, e.g., vertical, plane. The rotor usually tilts around its center shaft, i.e., the center axis of the center shaft extends perpendicular to the vertical plane while the uppermost part and the lowermost part of the rotor are tilted in opposite directions such that, e.g., the upper part protrudes past the vertical plane into a first side of the vertical plane while the lower part protrudes past the vertical plane into a second side of the vertical plane.

Hence, there is a need for an adjustable rotor support allowing simple adjustment of the rotor of the rotary heat exchanger either at manufacture or assembly.

SUMMARY

The aspects of the disclosed embodiments are directed to providing an improved rotary heat exchanger and an adjustable rotor support facilitating adjustment of the position of the rotor of a rotary heat exchanger.

The foregoing and other objects are achieved by the features of the independent claims. Further implementation forms are apparent from the dependent claims, the description, and the figures.

According to a first aspect, there is provided an adjustable rotor support comprising a carrier beam configured to receive a center shaft of a rotor; at least one support brace connected to the carrier beam; and an adjustment arrangement operably connected to the support brace(s), the adjustment arrangement being configured to generate movement of at least one of the support brace(s), movement of the support brace(s) generating movement of the carrier beam along an adjustment axis perpendicular to a center axis of the center shaft, the adjustment arrangement being configured to lock the support brace(s) in a position reached through the movement, the position being maintained by the adjustment arrangement during operation of the rotor.

This solution allows the rotor to be held securely in place within the rotor casing while also allowing its position to be adjusted to compensate for any forces applied onto the rotor by oppositely directed fluid streams. Hence, it is ensured that the rotor, during operation, rotates in the plane it was intended to rotate in. Furthermore, the solution allows adjustment by adding as few components as possible to existing solutions, keeping the number of components as low as possible.

In a possible implementation form of the first aspect, the support brace has a first brace end configured to engage a rotor casing in a first plane, and/or a second brace end configured to engage the carrier beam. This allows the components of the rotary heat exchanger comprising the adjustable rotor support to be securely interconnected.

In a further possible implementation form of the first aspect, the adjustment arrangement is configured to generate movement of the carrier beam such that a perpendicular distance between a center axis of the carrier beam and the first plane comprising the first brace end(s) of the support brace(s) increases or decreases, facilitating adjustment of the rotor without having to do any kind of disassembly In a further possible implementation form of the first aspect, the carrier beam has a first beam end, a center area, and a second beam end, the center area being configured to receive the center shaft of the rotor, the first beam end and the second beam end being configured to engage a rotor casing. This allows the carrier beam, and rotor, to be adjusted as much as necessary while moving as few components as possible.

In a further possible implementation form of the first aspect, the adjustment arrangement is configured to hold and/or lock the support brace in a position reached through the movement, reducing the need for continuous adjustment.

In a further possible implementation form of the first aspect, the adjustment arrangement is configured to generate movement of at least one of the support brace(s) by applying force onto the support brace(s) in directions parallel to the adjustment axis, or in directions parallel to the center axis of the carrier beam, allowing as simple and force effective ways as possible of adjusting the position of the carrier beam and rotor.

In a further possible implementation form of the first aspect, the adjustable rotor support comprises a first support brace and a second support brace arranged coaxially along the adjustment axis, the adjustment arrangement being configured to connect the first support brace to the rotor casing or to connect the second support brace to the carrier beam, such that a perpendicular distance between the center axis of the carrier beam and the first plane increases by the adjustment arrangement moving the first support brace away from the rotor casing or the second support brace away from the carrier beam along the adjustment axis, and decreases by the adjustment arrangement moving the first support brace towards the rotor casing or the second support brace towards the carrier beam along the adjustment axis. This allows a solution that takes up as little place as possible, has as few components as possible, and which can be as mechanically simple as possible yet still sturdy enough to support the rotor.

In a further possible implementation form of the first aspect, the adjustable rotor support comprises a first support brace and a second support brace arranged coaxially along the adjustment axis, the first support brace and the second support brace being interconnected by the adjustment arrangement such that the perpendicular distance between the center axis of the carrier beam and the first plane increases by the adjustment arrangement moving the first support brace and the second support brace away from each other, and decreases by the adjustment arrangement moving the first support brace and the second support brace towards each other. This allows a solution that takes up as little place as possible, has as few components as possible, and that can be located at the most suitable place along the diameter of the rotor, e.g., taking existing inspection hatches in a ventilation system into account.

In a further possible implementation form of the first aspect, the adjustable rotor support comprises a first support brace and a second support brace operably connected by the adjustment arrangement, the first brace ends of the support braces being arranged in the first plane and the second brace ends of the support braces being arranged in a second plane extending parallel to the first plane, and wherein the first support brace and the second support brace are interconnected by the adjustment arrangement such that the perpendicular distance between the center axis of the carrier beam and the first plane increases by the adjustment arrangement moving the first support brace and the second support brace towards each other, and decreases by the adjustment arrangement moving the first support brace and the second support brace away from each other. This allows a solution which takes is very stable.

In a further possible implementation form of the first aspect, the first support brace and the second support brace are pivotally arranged at the first brace ends such that the second brace ends pivot simultaneously towards or away from each other, or the first support brace and the second support brace are pivotally arranged at the second brace ends such that the first brace ends pivot simultaneously towards or away from each other, facilitating a very simple solution for adjusting the position of the carrier beam and rotor while still being very stable once the desired position has been achieved.

In a further possible implementation form of the first aspect, the pivoting movement of the first support brace and the second support brace is translated to linear movement of at least the center area of the carrier beam along the adjustment axis, facilitating a very simple yet reliable solution for adjusting the position of the carrier beam and rotor.

In a further possible implementation form of the first aspect, the first support brace and the second support brace are arranged at identical acute angles to the center axis of the carrier beam, independently of the distance between the center axis of the carrier beam and the first plane, providing very stable and reliable support regardless of position.

In a further possible implementation form of the first aspect, the first brace end or the second brace end comprises a slot extending parallel to the center axis of the carrier beam, and the carrier beam or the rotor casing comprises a pin protruding into the slot and being configured to move within the slot as the first support brace and the second support brace pivot, providing a simple mechanical solution for executing the adjustment of the carrier beam and rotor.

In a further possible implementation form of the first aspect, the first brace end or the second brace end comprises a pin extending parallel to the center axis of the center shaft, and the carrier beam or the rotor casing comprising a slot extending parallel to the center axis of the carrier beam, the pin protruding into the slot and being configured to move within the slot as the first support brace and the second support brace pivot, providing a further simple mechanical solution for executing the adjustment of the carrier beam and rotor.

In a further possible implementation form of the first aspect, opposite ends of the slot limit a range of movement of the carrier beam along the adjustment axis, the range of movement being easily adapted by adapting the length of the slot and the slot itself preventing any movement beyond that range.

In a further possible implementation form of the first aspect, the adjustment arrangement comprises a turnbuckle interconnecting the first support brace and the second support brace. A turnbuckle provides a simple and reliable solution for holding the carrier beam and rotor in the desired position, while still allowing simple and continuous adjustment.

According to a second aspect, there is provided a rotary heat exchanger comprising a rotor, a rotor casing configured to accommodate the rotor, and at least one adjustable rotor support according to the above.

This allows a rotary heat exchanger wherein the rotor is held securely in place within the rotor casing while also allowing the rotor position to be adjusted to compensate for any forces applied onto the rotor by oppositely directed fluid streams. Hence, it is ensured that the rotor, during operation, rotates in the plane it was originally intended to rotate in.

In a possible implementation form of the second aspect, the rotary heat exchanger comprises two adjustable rotor supports arranged on opposite sides of the rotor, the adjustable rotor supports being adjustable independently of each other, allowing the range of movement available for adjustment to be increased by being able to adjust on both sides of the rotor. Furthermore, this allows the position of the rotor to be adjusted even if one of the sides of the rotor should be inaccessible after assembling it on site. Usually, it is not possible to predict which side of the rotary heat exchanger will be inaccessible and therefore it is advantageous that the rotary heat exchanger comprises two adjustable rotor supports, allowing access regardless of the assembly site configuration.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
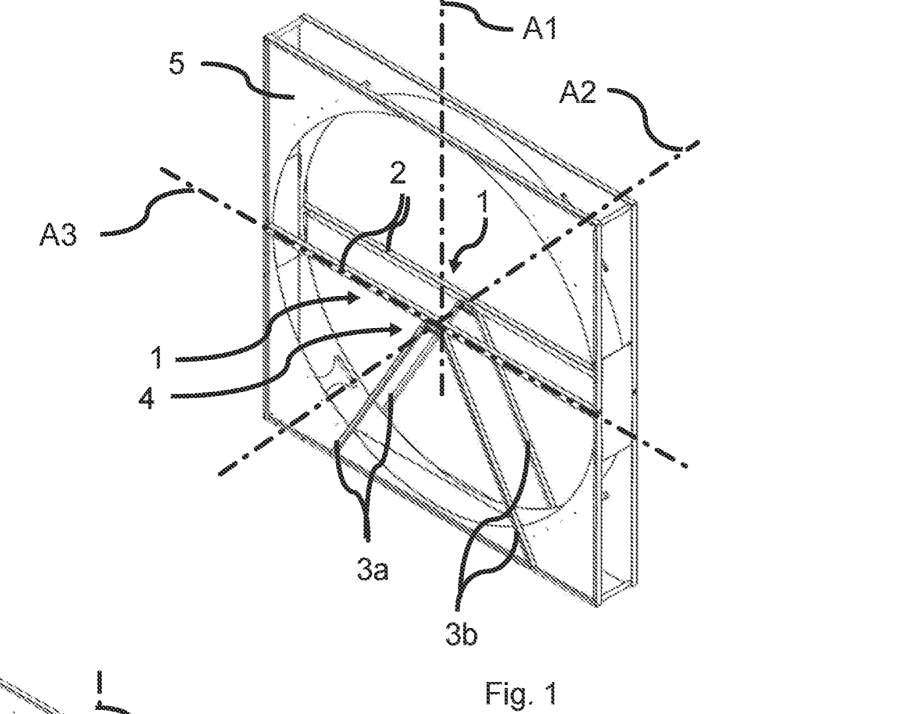
FIG. 1 is a perspective view of adjustable rotor supports in accordance with an example of the embodiments of the disclosure.
Figures 6, 7:
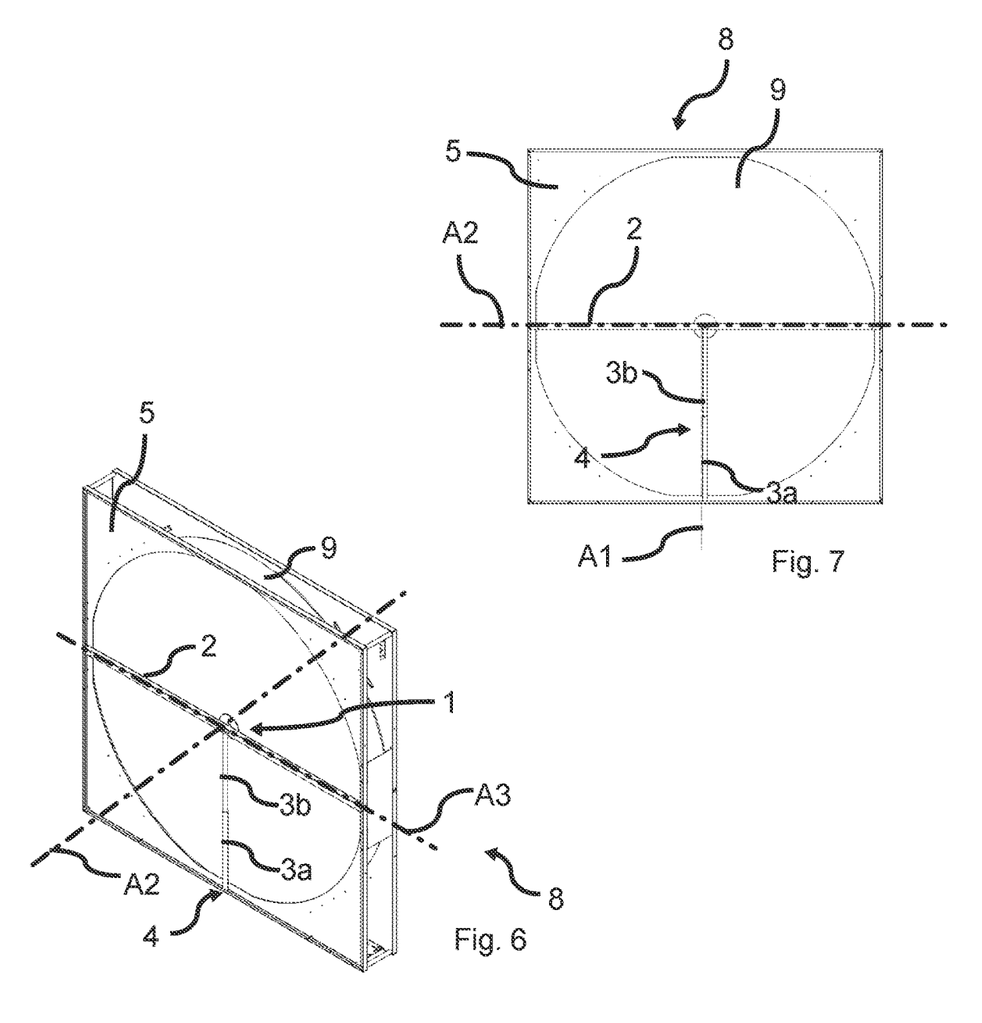
FIG. 6 is a perspective view of a rotary heat exchanger in accordance with an example of the embodiments of the disclosure.
FIG. 7 is a side view of a rotary heat exchanger in accordance with an example of the embodiments of the disclosure.
Figure 8:
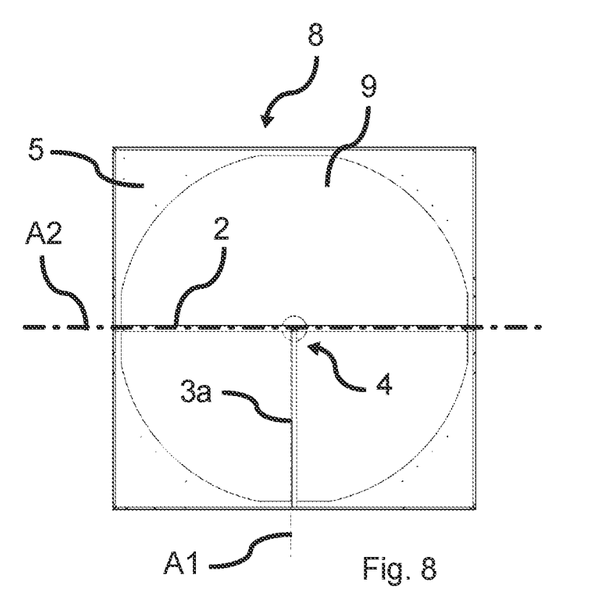
FIG. 8 is a side view of a rotary heat exchanger in accordance with a further example of the embodiments of the disclosure.

The aspects of the disclosed embodiments relate to a rotary heat exchanger 8 comprising a rotor 9, a rotor casing 5 configured to accommodate the rotor 9, and at least one adjustable rotor support 1 described in more detail below. FIGS. 6 to 8 show embodiments of such a rotary heat exchanger 8. FIG. 1 shows parts of a further embodiment of a rotary heat exchanger 8, i.e., the rotor casing 5 and the adjustable rotor supports 1.

The rotary heat exchanger 8 may comprise two adjustable rotor supports 1, the adjustable rotor supports 1 being arranged on opposite sides of the rotor 9 such that the position of the rotor may be adjusted at two locations, i.e., at opposite ends of the center shaft of the rotor. This allows the position of the rotor to be adjusted to compensate for the pressure applied onto the rotor by the fluid passing through the rotor. As an example, a vertically arranged rotary heat exchanger 8 may, during use, experience a slight tilt of the rotor 9 in the direction of the fluid stream, such that the rotor 9 itself is not perfectly vertical during use. Commonly, two oppositely directed streams of fluid pass through the same rotor, e.g., incoming fresh air entering a ventilation system from outside passing through the upper half of the rotary heat exchanger and outgoing ventilation air leaving the ventilation system through the lower half of the rotary heat exchanger. These two streams of air apply pressure onto the rotor in opposite directions, which may cause the rotor to tilt during use. However, the position of the rotor may be adjusted at assembly or installation, or even pre-adjusted during the manufacture of the rotary heat exchanger 8, by means of the adjustable rotor support(s) 1 towards directions that are opposite to the air stream directions. This would allow the rotor to be completely vertical during use, since the pressure applied by the air streams is compensated for. The rotary heat exchanger 8 may be arranged at any suitable angle, e.g., horizontally or at a 450 angle to the horizon. The tilt of the rotor 9 is such that the rotor 9 is inclined relative to the main plane of the rotary heat exchanger 8 and its casing 5, at least when there is no fluid flow and/or the rotor 9 is stationary.

The rotary heat exchanger 8 may comprise only one adjustable rotor support 1, allowing height adjustment at only one side of the rotary heat exchanger 8, which in many cases is sufficient. The rotary heat exchanger 8 is preferably mounted such that the side comprising the adjustable rotor support 1 is accessible from, e.g., an inspection hatch. If, instead, the rotary heat exchanger 8 comprises two adjustable rotor supports 1, the total height available for adjustment can be increased, i.e., a larger range of adjustment is allowed.

The two adjustable rotor supports 1 may be adjustable independently of each other, such that the installer can adjust the rotor as little or much as desired. Furthermore, by having two adjustable rotor supports 1, the installer can use the most accessible side of the rotor for making these adjustments. It might even be the case that only one side of the rotor is accessible due to the configuration of the site where the rotary heat exchanger 8 is installed.

The adjustable rotor support 1 comprises a carrier beam 2 configured to receive the center shaft of the rotor 9. The carrier beam 2 is a fixed element intended to carry and hold the weight of the rotor 9. The carrier beam 2 is, as illustrated in the FIGS., an elongated, three-dimensional element shaped such that it is strong enough to, to a large extent, hold the relatively heavy rotor 9 in its place at assembly and during operation. The carrier beam 2 is, in other words, a stationary construction element intended to carry weight. A bearing assembly may be arranged between the carrier beam 2 and the center shaft of the rotor 9, however, such a bearing assembly does not constitute a carrier beam 2.

At least one support brace 3a, 3b is connected to the carrier beam 2. FIGS. 1 to 7 show two support braces 3a, 3b arranged in different configurations. FIGS. 1 to 5 show two support braces 3a, 3b arranged at an angle to each other, while FIGS. 6 and 7 show two support braces 3a, 3b arranged coaxially. FIG. 8 shows an embodiment comprising only one support brace 3a.

A brace 3a, 3b is an element which supports weight or pressure, in this case the weight of the rotor 9 and to some extent the carrier beam 2. A brace is, in other words, a piece of structural material that serves to strengthen something.

An adjustment arrangement 4 is operably connected to the support brace(s) 3a, 3b, and the adjustment arrangement 4 is configured to generate movement of at least one of the support braces 3a, 3b. The movement may be a pivoting movement, a sliding movement or any type of movement of at least a part of the support brace(s) 3a, 3b.

The adjustment arrangement 4 is a mechanical arrangement comprising operably connected parts that move relative each other. The operably connected parts are preferably not elastic or capable of changing shape or dimensions. By utilizing parts that are moveable relative each other, yet rigid enough to maintain their shape, it is possible to achieve stable and long-lasting, if not permanent, adjustment of the position of the rotor 9.

This type of adjustment arrangement also facilitates movement which is continuous as opposed to incremental, i.e. the position of the rotor 9 can be very finely tuned as opposed to being limited to a predefined set of steps.

Figure 2:
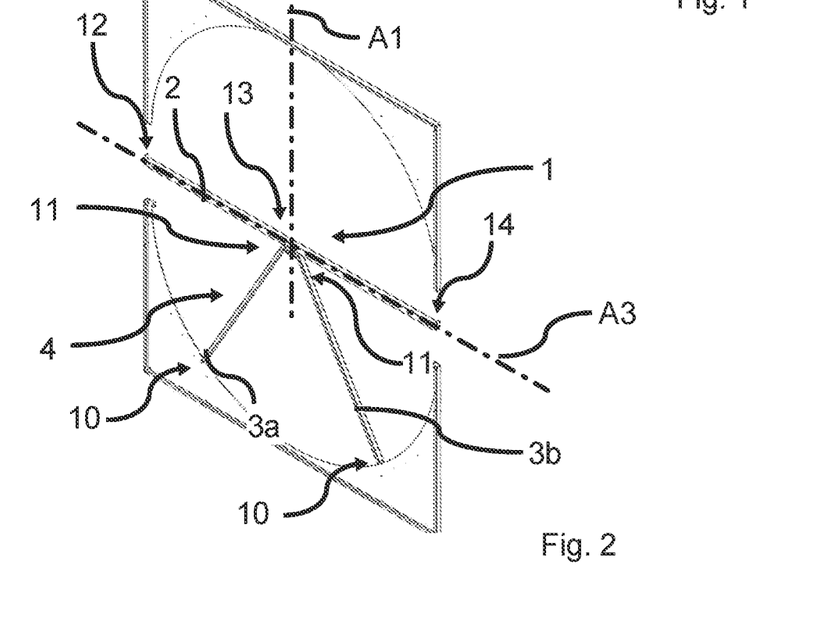
FIG. 2 is a perspective view of an adjustable rotor support in accordance with an example of the embodiments of the disclosure.

The movement of the support brace(s) 3a, 3b in turn generates movement of the carrier beam 2 along an adjustment axis A1 that is perpendicular to a center axis A2 of the center shaft. These axes are best illustrated in FIGS. 1 and 2.

The support brace(s) 3a, 3b may have a first brace end 10 configured to engage a rotor casing 5 and a second brace end 11 configured to engage the carrier beam 2. In other words, each support brace 3a, 3b may have a first brace end 10 configured to engage a rotor casing 5 and a second brace end 11 configured to engage the carrier beam 2, as illustrated in FIGS. 1 to 5 and 8. However, each support brace 3a, 3b may also have a first brace end 10 configured to engage a rotor casing 5 or a second brace end 11 configured to engage the carrier beam 2, as illustrated in FIGS. 6 and 7. In such an embodiment, each support brace 3a, 3b comprises an additional end, which additional ends are configured to interconnect with each other directly, as suggested in FIG. 6, or by means of the adjustment arrangement 4, as suggested in FIG. 7.

Figure 3:
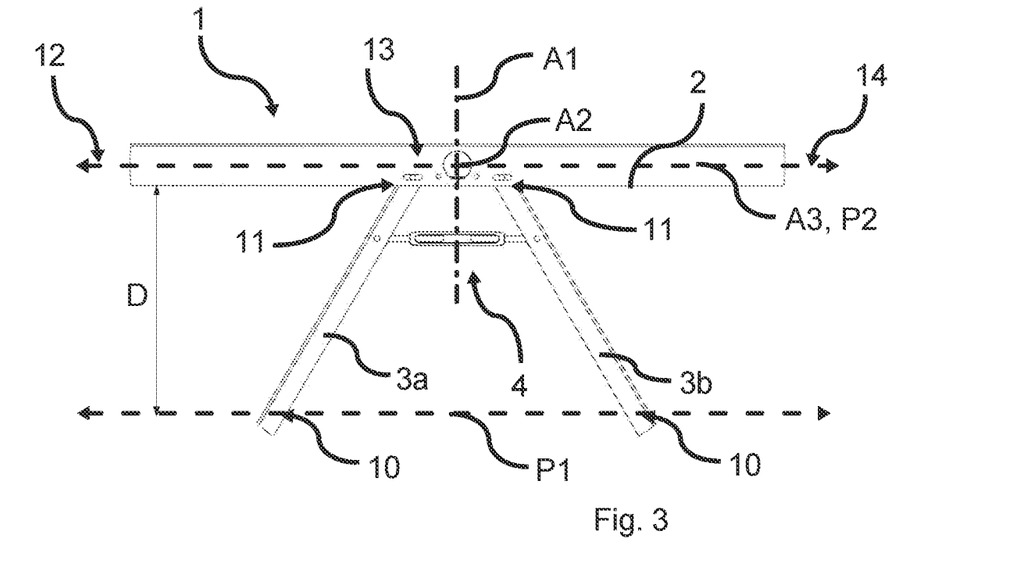
FIG. 3 is a side view of an adjustable rotor support in accordance with an example of the embodiments of the disclosure.
Figure 4:
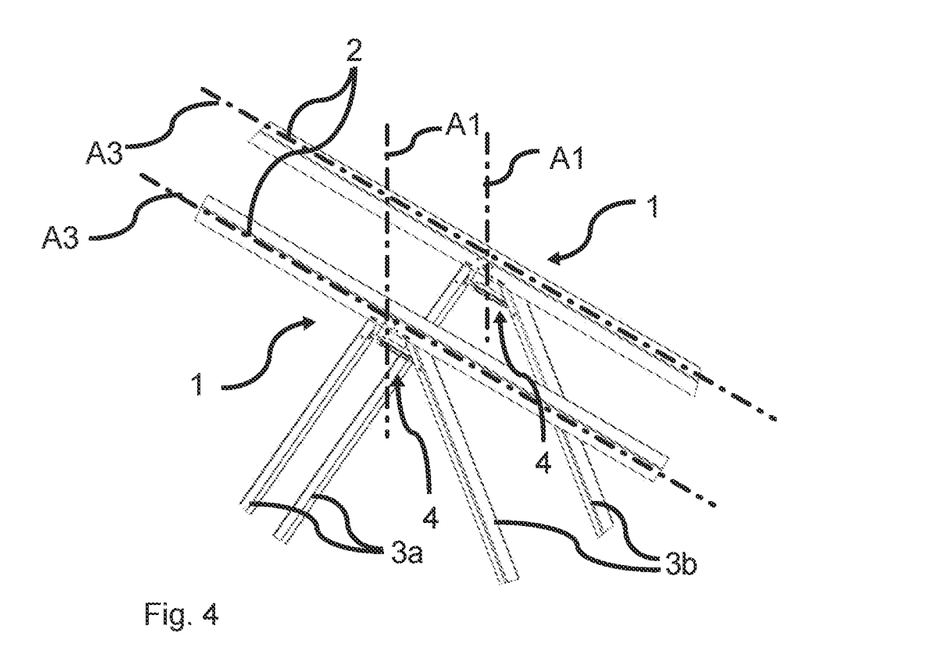
FIG. 4 is a perspective view of adjustable rotor supports in accordance with an example of the embodiments of the disclosure.

The adjustment arrangement 4 may be configured to generate movement of the carrier beam 2 such that a perpendicular distance D between a center axis A3 of the carrier beam 2 and a first plane P1 comprising the first brace end(s) 10 of the support brace(s) 3a, 3b increases or decreases, as illustrated in FIG. 3. The movement is not a constant movement, i.e. the adjustment arrangement 4 does not generate movement of the carrier beam 2 constantly or regularly during operation. The movement is generated only in situations such as when the rotary heat exchanger 8 is being assembled or installed, or as an irregular event when the position of the rotor 9 needs adjusting due to specific fluid streams. The movement does not generate any separation of the components of the rotary heat exchanger 8, but merely a change in their relative positions. Hence, the aspects of the disclosed embodiments are not used to facilitate replacement of a component such as the rotor 9.

The carrier beam 2 may have a first beam end 12, a center area 13, and a second beam end 14, as illustrated in FIG. 3. The center area 13 is configured to receive the center shaft of the rotor 9, while the first beam end 12 and the second beam end 14 are configured to engage the rotor casing 5.

The engagement between first beam end 12 or second beam end 14 and the rotor casing 5 may be fixed such that the first beam end 12 and the second beam end 14 remain stationary while the center area 13 is being adjusted. Hence, the carrier beam 2 may be slightly bent in response to adjustment via adjustment arrangement 4. The adjustment arrangement 4 may, in other words, be configured to generate movement of the support brace(s) 3a, 3b by applying force onto at least one of the support braces 3a, 3b. The force may be applied in directions parallel to the adjustment axis A1, i.e., perpendicular to the center axis A2 of the center shaft and a center axis A3 of the carrier beam 2, as illustrated in FIGS. 6 and 7, or in directions parallel to the center axis A3 of the carrier beam 2 as illustrated in FIGS. 1 to 5. The adjustment arrangement 4 is configured to hold and/or lock the support brace(s) 3a, 3b in any position reached through the movement, such that the position is maintained by the adjustment arrangement 4 during operation of the rotor 9 and rotary heat exchanger 8. In other words, the adjustment provided via the adjustment arrangement 4 is stable and long-lasting, even permanent. The adjustment arrangement 4 prevents gradual movement, away from the aforementioned position, over time, which is essential since the position set, e.g. at assembly or installation, should be maintained during operation.

The adjustment arrangement 4 may, e.g., comprise a turnbuckle wherein the nut of the turnbuckle functions as a lock, a different nut and thread arrangement wherein the engagement between nut and thread provides the lock, or e.g. a wedge element locked by means of form-fitting engagement with a groove. Furthermore, a lock may be provided using a releasable pin engaging an opening in any suitable component of the rotary heat exchanger 8 or the adjustable rotor support 1. The locking function ensures the adjustment arrangement 4 maintains the achieved component positions during operation.

The adjustment arrangement 4 may be arranged at any suitable location, however, its placement can advantageously be adapted to the surroundings such that the installer or other personnel can reach the adjustment arrangement 4 easily in order to adjust the position of the carrier beam 2 and rotor 9. The adjustment may be executed manually, i.e., by engaging the adjustment arrangement 4 by hand. However, the adjustment arrangement 4 may also be connected to any suitable motor such as an electrical motor driving the adjustment, e.g., in response to automated sensing of the rotor position.

As shown in FIGS. 6 and 7, the support brace(s) 3a, 3b may comprise a first support brace 3a and a second support brace 3b arranged coaxially along the adjustment axis A1.

The adjustment arrangement 4 may be configured to connect the first support brace 3a to the rotor casing 5, as illustrated in FIG. 6, or to connect the second support brace 3b to the carrier beam 2 (not shown). This allows the perpendicular distance D between the center axis A3 of the carrier beam 2 and the first plane P1 to increase by the adjustment arrangement 4 moving the first support brace 3a away from the rotor casing 5 or the second support brace 3b away from the carrier beam 2 along the adjustment axis A1. Correspondingly, this allows the perpendicular distance D to decrease by the adjustment arrangement 4 moving the first support brace 3a towards the rotor casing 5 or the second support brace 3b towards the carrier beam 2 along the adjustment axis A1. The adjustment arrangement 4 may, e.g., comprise a wedge-shaped element inserted between the first support brace 3a and the rotor casing 5 or between the second support brace 3b and the carrier beam 2.

Similarly, in an embodiment comprising only one support brace 3a, the adjustment arrangement 4 may be configured to connect the support brace 3a to the rotor casing 5 (not shown) or to connect the support brace 3a to the carrier beam 2, as illustrated in FIG. 8.

The first support brace 3a and the second support brace 3b may also be interconnected by the adjustment arrangement 4, e.g., by arranging the adjustment arrangement 4 between the first support brace 3a and the second support brace 3b, as shown in FIGS. 6 and 7. The first support brace 3a may, e.g., be fixed to the rotor casing 5 while the second support brace 3b is fixed to the center area 13 of the carrier beam 2 or to the center shaft of the rotor 9. By operating the adjustment arrangement 4, the first support brace 3a is moved away from, or towards, the second support brace 3b along the adjustment axis A1.

In other words, the perpendicular distance D between the center axis A3 of the carrier beam 2 and the first plane P1 increases when the first support brace 3a and the second support brace 3b move away from each other, and decreases when the first support brace 3a and the second support brace 3b move towards each other.

As shown in FIGS. 1 to 5, the adjustable rotor support 1 may instead comprise a first support brace 3a and a second support brace 3b arranged such that the second brace ends 11 of the two support braces 3a, 3b are arranged in a second plane P2 extending parallel to the first plane P1.

The first support brace 3a and the second support brace 3b are operably connected by the adjustment arrangement 4, i.e., the adjustment arrangement 4 extends between the first support brace 3a and the second support brace 3b. The adjustment arrangement 4 may be arranged closer to the first brace ends 10 of the support braces 3a, 3b than the corresponding second brace ends 3b. The adjustment arrangement 4 may be arranged as close as possible to the carrier beam 2, or even within or coplanar with the carrier beam 2.

The adjustment arrangement 4 may comprise a turnbuckle interconnecting the first support brace 3a and the second support brace 3b.

The first support brace 3a and the second support brace 3b are connected by the adjustment arrangement 4 such that the perpendicular distance D between the center axis A3 of the carrier beam 2 and the first plane P1 increases when the first support brace 3a and the second support brace 3b move towards each other, and decreases when the first support brace 3a and the second support brace 3b move away from each other. In other words, the first support brace 3a and the second support brace 3b may be configured to pivot towards or away from each other.

The first support brace 3a and the second support brace 3b may be pivotally arranged at the first brace ends 10 such that the second brace ends 11 pivot simultaneously towards or away from each other, as illustrated in FIGS. 1 to 5. Correspondingly, the first support brace 3a and the second support brace 3b may be pivotally arranged at the second brace ends 11, i.e., connected to the carrier beam 2, such that the first brace ends 10 pivot simultaneously towards or away from each other (not shown).

The first brace ends 10 may be configured to engage the rotor casing 5 or, correspondingly, the second brace ends 11 may be configured to engage the carrier beam 2 such that the pivoting movement of the first support brace 3a and the second support brace 3b is translated to linear movement of the carrier beam 2 along the adjustment axis A1.

The first support brace 3a and the second support brace 3b may be arranged at identical acute angles to the center axis A3 of the carrier beam 2.

The first brace end 10 or the second brace end 11 may comprise a slot 6 extending parallel to the center axis A3 of the carrier beam 2 (not shown). The carrier beam 2 or the rotor casing 5 may comprise a pin 7 protruding into the slot 6 and being configured to move within the slot 6 as the first support brace 3a and the second support brace 3b pivot. The pin 7 moves linearly within the slot 6, i.e., parallel with the center axis A3 of the carrier beam 2.

Figure 5:
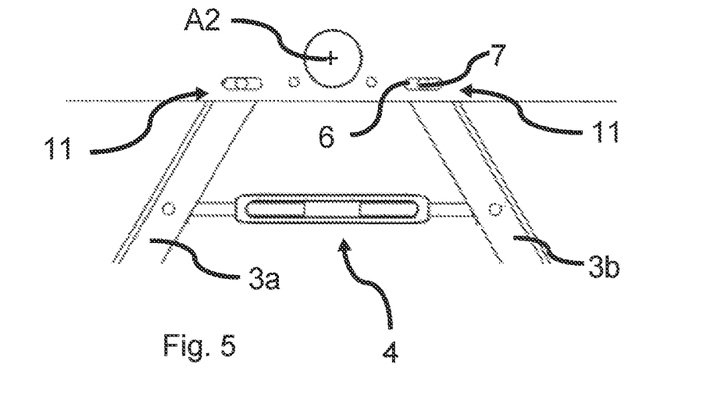
FIG. 5 is a partial side view of an adjustable rotor support in accordance with an example of the embodiments of the disclosure.

Alternately, the first brace end 10 or the second brace end 11 may comprise a pin 7 extending parallel to the center axis A2 of the center shaft, as shown in FIGS. 3 and 5. The carrier beam 2 or the rotor casing 5 may comprise a slot 6 extending parallel to the center axis A3 of the carrier beam 2, the pin 7 protruding into the slot 6 and being configured to move within the slot 6 as the first support brace 3a and the second support brace 3b pivot. The pin 7 moves linearly within the slot 6, i.e., parallel with the center axis A3 of the carrier beam 2.

The opposite ends of the slot 6 may be configured such that they limit the range of movement of the carrier beam 2 along the adjustment axis A1. This is achieved by the opposite ends of the slot 6 limiting the linear movement of the pin which in turn, limits the available pivot angle of the first support brace 3a and the second support brace 3b. This can be achieved by having a slot with closed ends, i.e., of a predefined length. However, the slot may also have one or two open ends, the range of movement in this case being limited by other means such as a separate locking means.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A rotary heat exchanger comprising a rotor, a rotor casing configured to accommodate the rotor, and at least one adjustable rotor support,
the adjustable rotor support comprising:
a carrier beam configured to receive a center shaft of the rotor;
at least one support brace connected to said carrier beam; and
an adjustment arrangement operably connected to said support brace, said adjustment arrangement being configured to generate movement of at least one of said support brace(s),
movement of said support brace(s) generating movement of said carrier beam along an adjustment axis (A1) perpendicular to a center axis (A2) of said center shaft, said adjustment arrangement being configured to lock said support brace(s) in a position reached through said movement, said movement being maintained by said adjustment arrangement during operation of said rotor, the movement of said carrier beam along said adjustment axis tilting said rotor relative to a main plane of the rotary heat exchanger and the casing when there is no fluid flow and/or the rotor is stationary,
the rotor position being adjustable to compensate for any forces applied onto the rotor by oppositely directed fluid streams such that the rotor, during operation, rotates in the plane it was originally intended to rotate in.

2. The rotary heat exchanger according to claim 1, wherein said support brace has a first brace end configured to engage the rotor casing in a first plane, and/or a second brace end configured to engage said carrier beam.

3. The rotary heat exchanger according to claim 2, wherein said carrier beam has a first beam end, a center area, and a second beam end, said center area being configured to receive said center shaft of said rotor, said first beam end and said second beam end being configured to fixedly engage the rotor casing.

4. The rotary heat exchanger according to claim 1, wherein said adjustment arrangement is configured to generate movement of at least one of said support brace(s) by applying force onto said support brace(s) in directions parallel to said adjustment axis (A1), or in directions parallel to said center axis (A3) of said carrier beam.

5. The rotary heat exchanger according to claim 2, wherein the at least one support brace comprises a first support brace and a second support brace arranged coaxially along said adjustment axis (A1), said adjustment arrangement being configured to connect said first support brace to said rotor casing or to connect said second support brace to said carrier beam, such that a perpendicular distance between said center axis (A3) of said carrier beam and said first plane (P1) increases by said adjustment arrangement moving said first support brace away from said rotor casing or said second support brace away from said carrier beam along said adjustment axis (A1), and decreases by said adjustment arrangement moving said first support brace towards said rotor casing or said second support brace towards said carrier beam along said adjustment axis (A1).

6. The rotary heat exchanger according to claim 2, wherein the at least one support brace comprises a first support brace and a second support brace arranged coaxially along said adjustment axis (A1), said first support brace and said second support brace being interconnected by said adjustment arrangement such that a perpendicular distance (D) between said center axis (A3) of said carrier beam and said first plane increases by said adjustment arrangement moving said first support brace and said second support brace away from each other along said adjustment axis (A1), and decreases by said adjustment arrangement moving said first support brace and said second support brace towards each other along said adjustment axis (A1).

7. The rotary heat exchanger according to claim 2, wherein the at least one support brace comprises a first support brace and a second support brace operably connected by said adjustment arrangement, said first brace ends of said support braces being arranged in said first plane (P1) and said second brace ends of said support braces being arranged in a second plane (P2) extending parallel to said first plane (P1), and wherein said first support brace and said second support brace are interconnected by said adjustment arrangement such that said perpendicular distance (D) between said center axis (A3) of said carrier beam and said first plane (P1) increases by said adjustment arrangement moving said first support brace and said second support brace towards each other, and decreases by said adjustment arrangement moving said first support brace and said second support brace away from each other.

8. The rotary heat exchanger according to claim 7, wherein said first support brace and said second support brace are pivotally arranged at said first brace ends such that said second brace ends pivot simultaneously towards or away from each other, or said first support brace and said second support brace are pivotally arranged at said second brace ends such that said first brace ends pivot simultaneously towards or away from each other.

9. The rotary heat exchanger according to claim 7, wherein said pivoting movement of said first support brace and said second support brace is translated to linear movement of at least said center area of said carrier beam along said adjustment axis.

10. The rotary heat exchanger according to claim 7, wherein said first support brace and said second support brace are arranged at identical acute angles to said center axis (A3) of said carrier beam independently of the distance (D) between said center axis (A3) of said carrier beam and said first plane (P1).

11. The rotary heat exchanger according to claim 7, wherein said first brace end or said second brace end comprises a slot extending parallel to said center axis of said carrier beam, and said carrier beam or said rotor casing comprises a pin protruding into said slot and being configured to move within said slot as said first support brace and said second support brace pivot.

12. The rotary heat exchanger according to claim 8, wherein said first brace end or said second brace end comprises a pin extending parallel to said center axis (A2) of said center shaft, and said carrier beam or said rotor casing comprising a slot extending parallel to said center axis (A3) of said carrier beam, said pin protruding into said slot and being configured to move within said slot as said first support brace and said second support brace pivot.

13. The rotary heat exchanger according to claim 11, wherein opposite ends of said slot limit a range of movement of said carrier beam along said adjustment axis.

14. The rotary heat exchanger according to claim 5, wherein said adjustment arrangement comprises a turnbuckle interconnecting said first support brace and said second support brace.

15. The rotary heat exchanger according to claim 1, comprising two adjustable rotor supports arranged on opposite sides of said rotor, said adjustable rotor supports being adjustable independently of each other.

\* \* \* \* \*